(12) United States Patent
Hopkins

(10) Patent No.: US 11,624,429 B1
(45) Date of Patent: Apr. 11, 2023

(54) COMPACT LINEAR DRIVE MECHANISM

(71) Applicant: The United States of America as Represented by the Secretary of the Navy, Indian Head, MD (US)

(72) Inventor: James K. Hopkins, California, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 15 days.

(21) Appl. No.: 17/300,510

(22) Filed: Jul. 28, 2021

(51) Int. Cl.
*F16H 25/20* (2006.01)

(52) U.S. Cl.
CPC ....... *F16H 25/20* (2013.01); *F16H 2025/204* (2013.01); *F16H 2025/2053* (2013.01); *F16H 2025/2087* (2013.01)

(58) Field of Classification Search
CPC ..... F16H 2025/2087; F16H 2025/2053; F16H 2025/204; F16H 25/20
See application file for complete search history.

(56) References Cited

U.S. PATENT DOCUMENTS

| | | | | |
|---|---|---|---|---|
| 1,825,957 A * | 10/1931 | Johnson | ... | B21B 31/24 475/5 |
| 3,493,233 A * | 2/1970 | Foufounis | ... | G07F 9/002 369/30.01 |
| 3,499,344 A * | 3/1970 | Pickles | ... | B60N 2/0224 475/149 |
| 4,424,719 A * | 1/1984 | Pretsch | ... | B60K 23/02 74/665 G |
| 5,035,094 A | 7/1991 | Legare | | |
| 5,733,096 A | 3/1998 | Van Doren et al. | | |
| 8,011,675 B2 | 9/2011 | Suyama | | |
| 8,555,737 B2 * | 10/2013 | Kohmura | ... | F16H 25/20 74/89.3 |
| 8,601,889 B2 | 12/2013 | Lessing | | |
| 9,400,040 B2 | 7/2016 | Tseng | | |
| 10,371,238 B2 | 8/2019 | Gutelius et al. | | |
| 10,731,740 B1 | 8/2020 | Cui et al. | | |
| 2005/0103928 A1 * | 5/2005 | Flatt | ... | H02K 7/116 244/10 |
| 2007/0266809 A1 * | 11/2007 | Ziesel | ... | F16H 25/2252 74/127 |
| 2007/0295126 A1 | 12/2007 | Wang | | |
| 2021/0388885 A1 * | 12/2021 | Takizawa | ... | F16H 25/20 |

FOREIGN PATENT DOCUMENTS

| | | |
|---|---|---|
| EP | 2799740 | 11/2014 |
| WO | WO 2019091525 A1 * | 5/2019 |

* cited by examiner

Primary Examiner — David M Fenstermacher
(74) Attorney, Agent, or Firm — Fredric J. Zimmerman

(57) ABSTRACT

A linear drive mechanism includes a drive gear connected to an actuator. A first assembly is connected to the drive gear. The first assembly includes a first plurality of leadscrew assemblies connected to a first output link of the drive mechanism. A second assembly is connected to the drive gear. The second assembly includes a second plurality of leadscrew assemblies connected to a second output link of the drive mechanism. The first output link is positioned opposite the second output link and the first assembly and the second assembly are located between the first output link and the second output link.

19 Claims, 4 Drawing Sheets

COMPACT LINEAR DRIVE MECHANISM

ORIGIN OF THE INVENTION

The invention described herein was made in the performance of official duties by employees of the U.S. Department of the Navy and may be manufactured, used, or licensed by or for the Government of the United States for any governmental purpose without payment of any royalties thereon.

BACKGROUND

Field of the Invention

The present invention relates to linear drive mechanisms and in particular to a compact linear drive mechanism that combines elements of a traditional planetary gear system with a traditional leadscrew mechanism.

Description of the Background

A traditional leadscrew mechanism, shown in FIG. 1, consist of a rotating leadscrew 101, a traveling nut 104 and a sliding tube 107 encased in a fixed housing 110. As the leadscrew 101 rotates, the traveling nut 104 moves along the axial length of the leadscrew 101. The sliding tube 107 is affixed to the travel nut 104. Therefore, the sliding tube 107 moves in unison with the traveling nut 104 providing a linear motion output given rotary input. The fixed housing 110 has features that prevent the traveling nut 104 and sliding tube 107 from rotating while the leadscrew 101 freely rotates. The mechanism may be driven by motor, typically an electric motor 113, resulting in a linear actuator. The traditional leadscrew mechanism has advantages that include a large load carrying capability, simple design, large mechanical advantage, precise and accurate linear motion, and a self-locking feature, which prevents the mechanism from being back-driven. The main disadvantage is the maximum stroke-to-axial length is relatively low. A significant portion of the sliding tube 107 must remain in the fixed housing 110 to prevent axial deflection of the sliding tube 107 at maximum stroke. This limits the full extension of the mechanism with respect to the compressed length. Other variants of the screw mechanism include the ball screw and the roller screw, both of which have the same basic limitation in terms of maximum stroke-to-axial length.

There remains a need for a compact linear drive mechanism that provides all of the advantages of a traditional leadscrew mechanism with the additional advantages of both doubling the maximum output length and doubling the rate of extension/contraction without increasing the relative length of the mechanism housing, resulting in a faster and more compact leadscrew mechanism.

SUMMARY

The compact linear drive mechanism disclosed herein combines elements of a traditional planetary gear system with a traditional leadscrew mechanism. Two sets of three leadscrew assemblies are used, where each set has an opposite sense screw thread direction, all commonly driven by a single (sun) gear through a pseudo-planetary gear arrangement. Each set of three lead screws linearly move a common output link located on a face of the drive mechanism. Due to the opposite screw sense and the coupled input, both output links move simultaneously, expanding or compressing the total length of the mechanism. Each output link has a nested rotary input to drive the mechanism from either face. The resulting total linear displacement of the mechanism and displacement rate are approximately equal to twice that of a traditional leadscrew drive mechanism, given the same leadscrew and housing dimensions.

It is an object of the present invention to provide a compact linear drive mechanism with the ability to drive two leadscrew mechanism assemblies simultaneously, using a simple gear arrangement, doubling the maximum stroke length of the traditional leadscrew linear drive mechanism and doubling the extension and contraction rate.

It is another object of the present invention to integrate the leadscrew nut with a planetary gear system and the use of forward and reverse thread lead screws to enable dual action of the output links while maintaining a minimal number of parts. The multi-leadscrew output link configuration enables maximum travel of the output link, while maintaining stability with minimal axial deflection.

Additionally, the in-line input link allows an external power source to be used for the mechanism without impeding the movement of the dual axial output links. The design is highly scalable as the planetary gear system and leadscrew assemblies have been demonstrated at various scales.

According to an aspect of the invention, a linear drive mechanism includes a drive gear connected to an actuator. A first assembly is connected to the drive gear. The first assembly includes a first plurality of leadscrew assemblies connected to a first output link of the drive mechanism. A second assembly is connected to the drive gear. The second assembly includes a second plurality of leadscrew assemblies connected to a second output link of the drive mechanism. The first output link is positioned opposite the second output link and the first assembly and the second assembly are located between the first output link and the second output link.

According to an aspect of the invention, a drive mechanism has a drive gear connected to an actuator. A first set of leadscrew assemblies is connected to a first output link, and a second set of leadscrew assemblies is connected to a second output link. The drive gear is connected to the first set of leadscrew assemblies and the second set of leadscrew assemblies. Leadscrew assemblies in the first set of leadscrew assemblies have opposite sense screw thread direction in relation to leadscrew assemblies in the second set of leadscrew assemblies.

According to an exemplary dual acting linear drive mechanism, a drive mechanism has a first face and a second face opposite the first face. The drive mechanism includes a drive gear connected to an actuator. A first set of leadscrew assemblies is connected to a first output link through the first face of the drive mechanism. A second set of leadscrew assemblies is connected to a second output link through the second face of the drive mechanism. The drive gear is connected to the first set of leadscrew assemblies and the second set of leadscrew assemblies. The leadscrew assemblies in the first set of leadscrew assemblies have opposite sense screw thread direction in relation to leadscrew assemblies in the second set of leadscrew assemblies. Rotary operation of the actuator in a first direction causes the first output link and the second output link to move linearly away from the first face and the second face, respectively. Rotary operation of the actuator in a second direction causes the first output link and the second output link to move linearly toward the first face and the second face, respectively.

DESCRIPTION OF THE DRAWINGS

These and other objects, features and advantages of the present invention will become apparent upon reference to the following description of the exemplary embodiments and to the drawings, wherein corresponding reference characters indicate corresponding parts throughout the several views of the drawings and wherein.

DETAILED DESCRIPTION OF EXEMPLARY EMBODIMENTS

Actuation of linear output motion by rotational input motion is commonly achieved by rotating a lever or a unitary thread screw. In a typical configuration, an electric linear actuator uses a single helical screw having a large diameter to enhance the buckling strength. As is well known, the larger the base diameter the helical thread has, the larger the pitch height of the thread. As the power (P=Force×Distance) is fixed for the power source, the travelling distance, or the pitch height in the case will negatively affect the output force.

The Compact Linear Drive Mechanism disclosed herein has dual acting axial output links and an in-line Input. Two sets of three leadscrew assemblies are used, where each set has an opposite sense screw thread direction, all commonly driven by a single (sun) gear through a pseudo-planetary gear arrangement. Each set of three lead screws linearly move a common output link located on one face of the drive mechanism. Due to the opposite screw sense and the coupled input, both output links move simultaneously, expanding or compressing the total length of the mechanism. Each output link has a nested rotary input to drive the mechanism from either face. The resulting total linear displacement of the mechanism and displacement rate are approximately equal to twice that of a traditional leadscrew drive mechanism, given the same leadscrew and housing dimensions.

Figure 1:
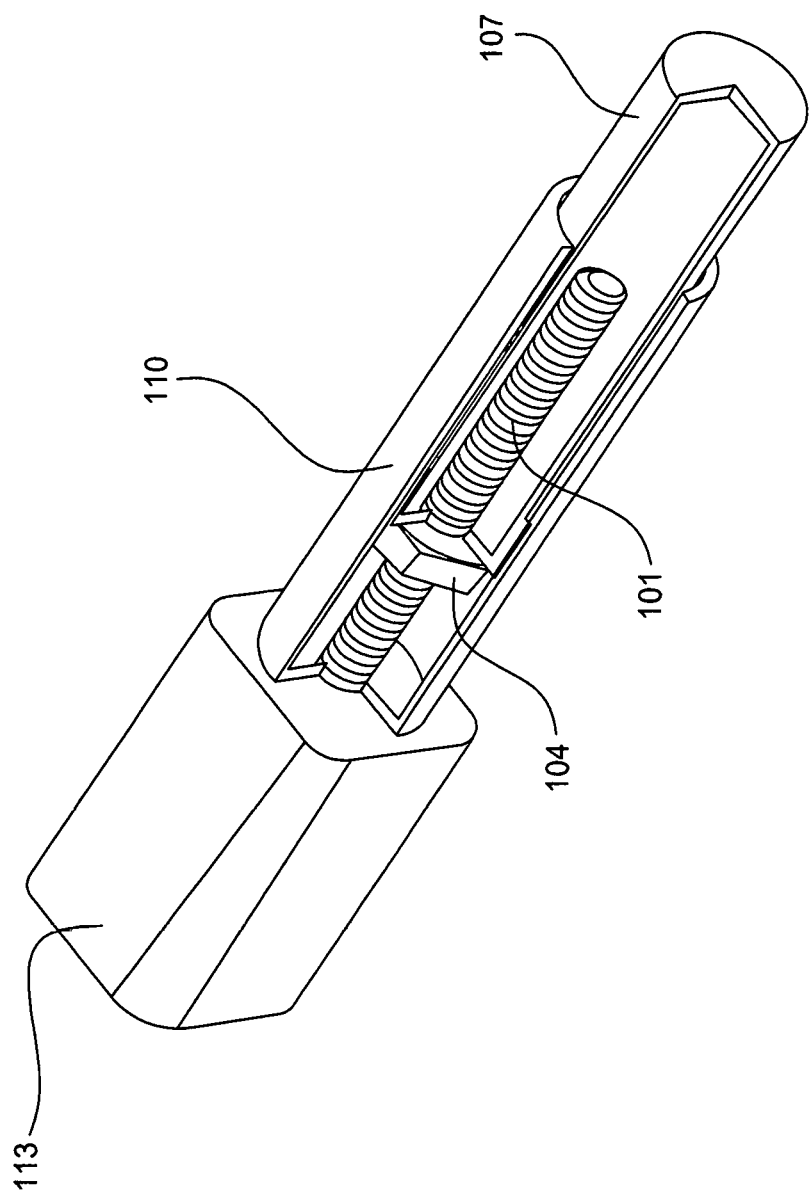
FIG. 1 is a perspective view of a prior art leadscrew mechanism.
Figure 2:
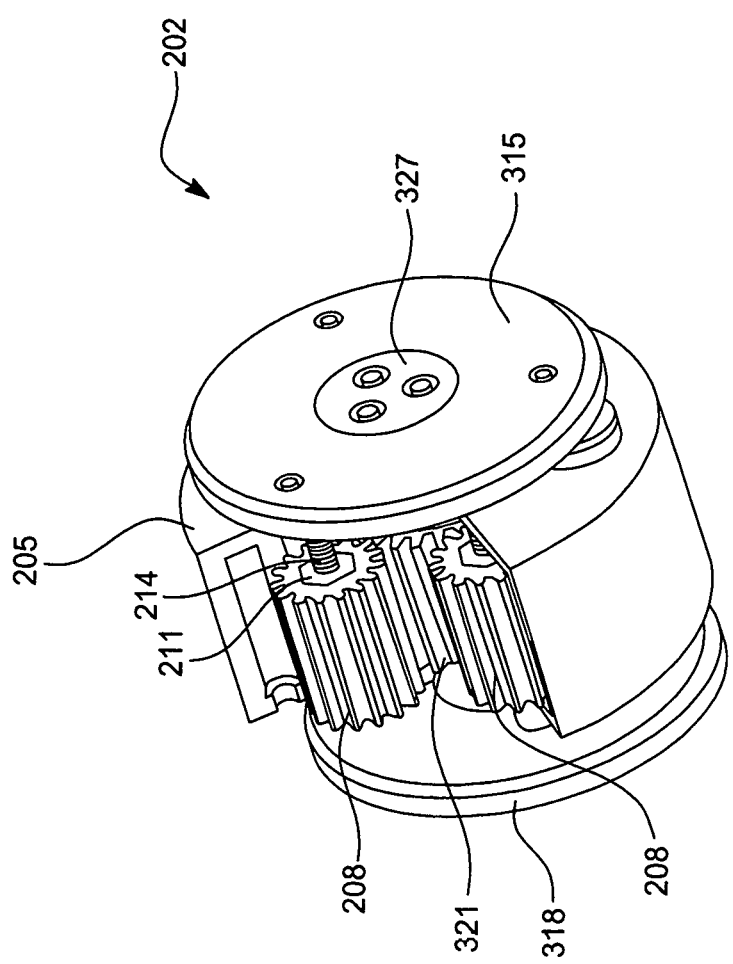
FIG. 2 is a cut-away view of a linear drive mechanism according to devices herein.
Figure 3:
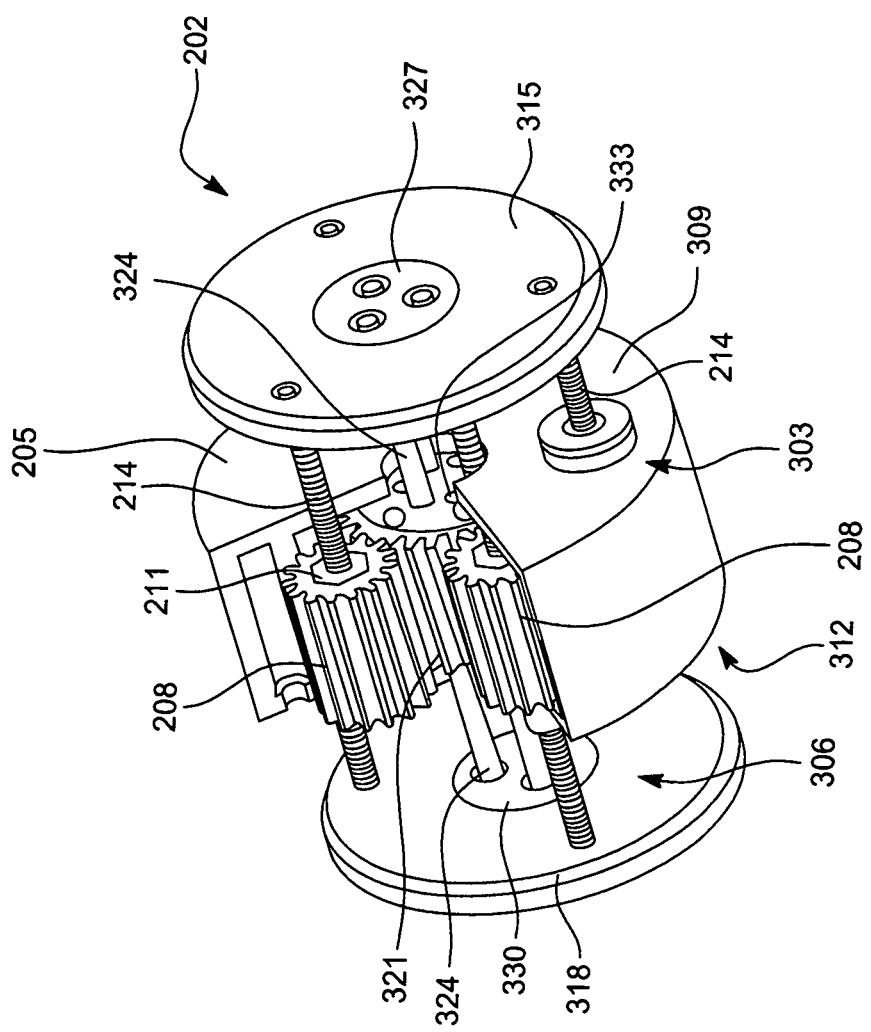
FIG. 3 is a cut-away view of the linear drive mechanism of FIG. 2 in an expanded configuration.

Referring to FIGS. 2 and 3, a Compact Linear Drive Mechanism, indicated generally as 202, combines some of the elements of a traditional planetary gear system with a traditional leadscrew mechanism. The drive mechanism 202 includes a housing 205. Within the housing 205, there exists a plurality of planet gears 208 that are allowed to rotate but not revolve within the drive mechanism housing 205. In the examples described herein, there are six (6) planet gears 208; however, other even numbers of planet gears may be used. Each planet gear 208 encompasses a leadscrew nut 211, which rotates with the planet gear 208. Each leadscrew nut 211 mates with a threaded leadscrew rod 214.

As best seen in FIG. 3, there are two sets of leadscrew rods 214. The first set 303 has three leadscrew rods 214 and the second set 306 has three leadscrew rods 214. The leadscrew rods 214 in the first set 303 have a forward screw thread, while the leadscrew rods 214 in the second set 306 have a reverse screw thread. The leadscrew nuts 211 have forward screw thread or reverse screw thread corresponding to the leadscrew rod 214 mated thereto. The first set 303 of three leadscrew rods 214 exits the housing 205 through one face 309 of the housing 205, while the second set 306 of three leadscrew rods 214 exits the housing 205 through the opposite face 312.

Each set 303, 306 of three leadscrew threaded rods 214 is rigidly fixed to an output link 315, 318. The output link 315 for the first set 303 of three leadscrew rods 214 is external to the face 309 of the housing 205 and the output link 318 for the second set 306 of three leadscrew rods 214 is external to the opposite face 312 of the housing 205. The output link 315, 318 prevents the rotation of each leadscrew rod 214.

All six planet gears 208 are in mesh with and are all driven by the single input sun gear 321 located in the center of the housing 205. As the sun gear 321 rotates, all six planet gears 208 rotate at the same rate and in the same direction; therefore, all six leadscrew nuts 211 also rotate at the same rate and in the same direction. Due to the opposite sense of the screw threads between the two sets 303, 306 of lead screws 214, the two sets 303, 306 of lead screw rods 214 move linearly in opposite directions from one another. Therefore, both sets 303, 306 of lead screw rods 214 linearly advance or retreat in the opposite direction of each other. The result is that the output links 315, 318 expand and contract in unison about the lengthwise axis of the housing 205.

As described above, some embodiments utilize a separate leadscrew nut 211 encased in a planet gear 208. In some embodiments, the threads for the leadscrew nut 211 may be directly cut into the planet gear 208, thus reducing weight, complexity and part count. Furthermore; in some embodiments, the leadscrew rod 214 could be replaced with a ball screw or roller screw to reduce friction, increase efficiency and functional life. As shown in FIGS. 2 and 3, the planet gears 208 and sun gear 321 may use spur gear pattern. It is contemplated that the spur gear pattern can be replaced with helical gears for both the sun gear 321 and the planet gears 208.

The sun gear 321 is connected to a set of six sliding rods 324. The sliding rods 324 are rigidly mated to one of two input disks 327, 330 on a first end, in an alternating pattern similar to the threaded leadscrew rods. The sliding rods 324 are slidingly engaged in apertures 333 in the sun gear 321, on a second end. Each input disk 327, 330 is slidably attached to an output link 315, 318 and moves linearly with the output link. The input disks 327, 330 are allowed to rotate freely within the output link 315, 318. As the input disks 327, 330 are rotated, the sliding rods 324 cause the sun gear 321 to rotate, which in turn causes the output links 315, 318 to expand and contract in unison about the lengthwise axis of the housing 205, as described above. The sliding rods 324 slide within the apertures 333 to maintain contact with the sun gear 321 throughout the expansion and contraction.

An external motor, or other appropriate power source, may be mounted to either of the two output links 315, 318 and directly drive the associated input disk 327, 330. This configuration allows the opposite output link to freely advance or retreat relative to the fixed output link, achieving double the total expansion length and expansion rate of a traditional leadscrew mechanism.

Figure 4:
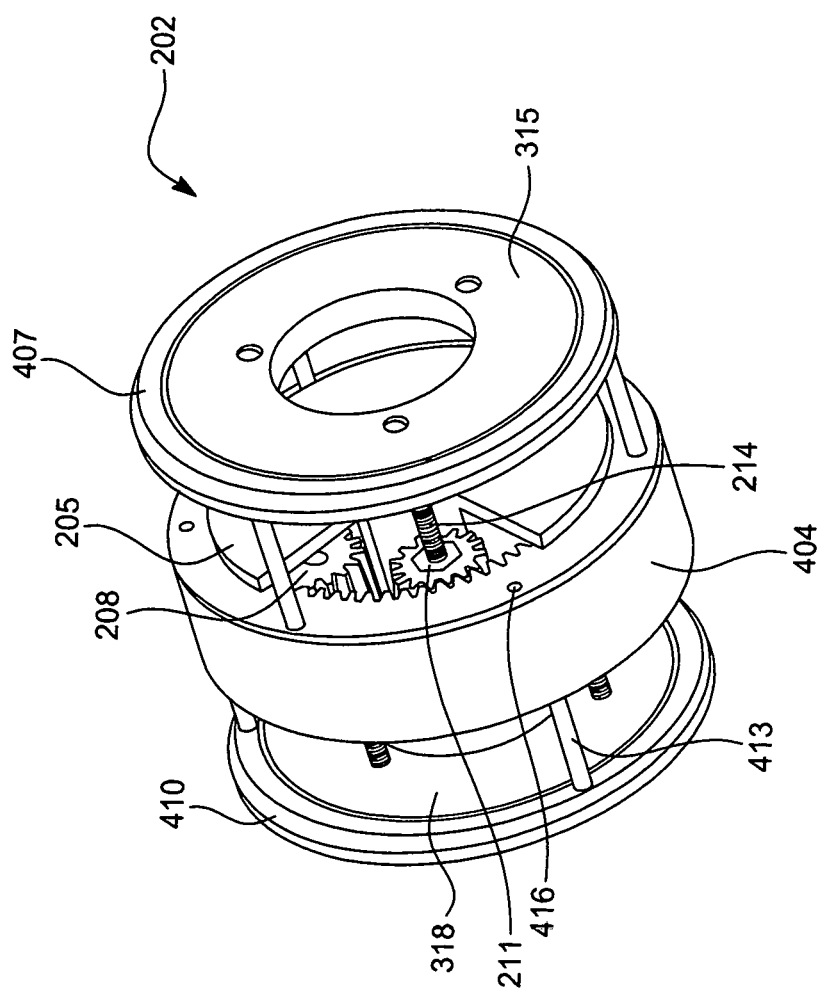
FIG. 4 is a perspective view of another linear drive mechanism according to devices herein.

In the exemplary embodiment shown in FIGS. 2 and 3, there is a sun gear 321 and planet gears 208, but no ring gear. Referring now to FIG. 4, the sun gear within the planetary gear drive is replaced with an external ring gear 404. Each output link 315, 318 has a peripheral input ring 407, 410, respectively, that operates similar to the input disks 327, 330. The external ring gear 404 is connected to a set of sliding rods 413. The sliding rods 413 are rigidly mated to the peripheral input rings 407, 410, in an alternating pattern similar to the threaded leadscrew rods, on a first end. The sliding rods 413 are slidingly engaged in apertures 416 in the external ring gear 404, on a second end. The peripheral input rings 407, 410 are allowed to rotate freely around the output link 315, 318. As the peripheral input rings 407, 410 are rotated, the sliding rods 413 cause the external ring gear 404 to rotate, which in turn causes the output links 315, 318 to expand and contract in unison about the lengthwise axis of the housing 205, as described above. The sliding rods 413 slide within the apertures 416 to maintain contact with the external ring gear 404 throughout the expansion and contraction by moving linearly through the external ring gear 404.

The external ring gear 404 can be driven in-line with an external motor, or other appropriate power source, mounted to either of the two output links 315, 318 to directly drive the associated peripheral input rings 407, 410. The external ring gear 404 also may be driven directly by a motor, or other appropriate power source, located parallel to the external ring gear 404, adjacent to the housing 205.

It is contemplated that the input disks 327, 330 or peripheral input rings 407, 410 can be replaced with a static input shaft or tube.

One advantage of using an external ring gear 404 instead of a sun gear 321 is the hollow space created in the center of the mechanism, which may be used to route Cabling or embed another device. One advantage of using a sun gear 321 instead of an external ring gear 404 is that the configuration minimizes the diameter of the mechanism. Additionally, the use of a sun gear 321 reduces the inertial forces from the spinning input disk compared to the spinning of the peripheral input rings 407, 410.

The invention has been described with references to specific embodiments. While particular values, relationships, materials, and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, terms such as "right", "left", "vertical", "horizontal", "top", "bottom", "upper", "lower", "under", "below", "underlying", "over", "overlying", "parallel", "perpendicular", etc., as used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A linear drive mechanism, comprising:
    a drive gear being connected to an actuator;
    a first assembly being connected to the drive gear, the first assembly comprises a first plurality of leadscrew assemblies connected to a first output link of the drive mechanism; and
    a second assembly being connected to the drive gear,
        wherein the second assembly comprises a second plurality of leadscrew assemblies connected to a second output link of the drive mechanism,
        wherein the first output link is positioned opposite the second output link and the first assembly and the second assembly are located between the first output link and the second output link,
        wherein each of the leadscrew assemblies further comprises:
    a planet gear connected to the drive gear;
    a leadscrew nut encased in the planet gear; and
    a threaded leadscrew rod engaged in the leadscrew nut,
        wherein the threaded leadscrew rods and leadscrew nuts in the first plurality of leadscrew assemblies have a forward screw thread, and
        wherein the threaded leadscrew rods and leadscrew nuts in the second plurality of leadscrew assemblies have a reverse screw thread.

2. The linear drive mechanism according to claim 1, wherein the output links prevent rotation of the threaded leadscrew rods.

3. The linear drive mechanism according to claim 1, further comprising a housing having a first face and a second face opposite the first face, wherein the planet gears mesh with the drive gear and rotate but do not revolve within the housing, and wherein the threaded leadscrew rods in the first plurality of leadscrew assemblies exit the housing through the first face and the threaded leadscrew rods in the second plurality of leadscrew assemblies exit the housing through the second face.

4. The linear drive mechanism according to claim 1, further comprising a housing having a first face and a second face opposite the first face, wherein the planet gears mesh with the drive gear and rotate but do not revolve within the housing, wherein the threaded leadscrew rods in the first plurality of leadscrew assemblies exit the housing through the first face and the threaded leadscrew rods in the second plurality of leadscrew assemblies exit the housing through the second face, and wherein the first output link is external to the housing and adjacent to the first face, and wherein the second output link is external to the housing and adjacent to the second face.

5. The linear drive mechanism according to claim 1, wherein the drive gear comprises one of a sun gear and a ring gear.

6. The linear drive mechanism according to claim 1, the actuator further comprising an input disk slidably engaged with the output link and which rotates within one of the output link and an input ring slidably engaged with the output link and which rotates around the output link; and a plurality of sliding rods, wherein the plurality of sliding rods are rigidly attached to one of the input disk and the input ring, wherein the sliding rods are slidingly engaged with the drive gear, and wherein the output links expand and contract in the opposite direction of each other by operation of the actuator.

7. An apparatus, comprising:

a drive mechanism comprising a drive gear connected to an actuator;

a first set of leadscrew assemblies being connected to a first output link; and a second set of leadscrew assemblies being connected to a second output link, wherein the drive gear is connected to the first set of leadscrew assemblies and the second set of leadscrew assemblies, and wherein leadscrew assemblies in the first set of leadscrew assemblies have opposite sense screw thread direction in relation to leadscrew assemblies in the second set of leadscrew assemblies.

8. The apparatus according to claim 7, wherein the first set of leadscrew assemblies and the second set of leadscrew assemblies further comprise:

a planet gear connected to the drive gear;

a leadscrew nut encased in the planet gear; and a threaded leadscrew rod engaged in the leadscrew nut.

9. The apparatus according to claim 8, wherein the first output link prevents rotation of the threaded leadscrew rods in the first set of leadscrew assemblies, and wherein the second output link prevents rotation of the threaded leadscrew rods in the second set of leadscrew assemblies.

10. The apparatus according to claim 8, further comprising a housing having a first face and a second face opposite the first face, wherein the planet gears mesh with the drive gear and rotate within the housing absent revolving within the housing, and wherein the threaded leadscrew rods in the first set of leadscrew assemblies exit the housing through the first face and the threaded leadscrew rods in the second set of leadscrew assemblies exit the housing through the second face.

11. The apparatus according to claim 8, further comprising a housing having a first face and a second face opposite the first face, wherein the planet gears mesh with the drive gear and rotate within the housing absent revolving within the housing, wherein the threaded leadscrew rods in the first set of leadscrew assemblies exit the housing through the first face and the threaded leadscrew rods in the second set of leadscrew assemblies exit the housing through the second face, wherein the first output link is external to the housing and adjacent to the first face, and wherein the second output link is external to the housing and adjacent to the second face.

12. The apparatus according to claim 7, wherein the drive gear comprises one of a sun gear and a ring gear.

13. The apparatus according to claim 7, the actuator further comprising:

an input disk slidably engaged with the output link and which rotates within one of the output link and an input ring slidably engaged with the output link and which rotates around the output link; and a plurality of sliding rods, wherein the sliding rods are rigidly attached to the input disk or input ring wherein the sliding rods are slidingly engaged with the drive gear, and wherein the output links expand and contract in the opposite direction of each other by operation of the actuator.

14. A dual acting linear drive mechanism, comprising:

a drive mechanism including a first face and a second face being opposite the first face, wherein the drive mechanism comprises a drive gear connected to an actuator;

a first set of leadscrew assemblies being connected to a first output link through the first face of the drive mechanism; and a second set of leadscrew assemblies being connected to a second output link through the second face of the drive mechanism, wherein the drive gear is connected to the first set of leadscrew assemblies and the second set of leadscrew assemblies, wherein leadscrew assemblies in the first set of leadscrew assemblies have opposite sense screw thread direction in relation to leadscrew assemblies in the second set of leadscrew assemblies, wherein rotary operation of the actuator in a first direction causes the first output link and the second output link to move linearly away from the first face and the second face, respectively and wherein the rotary operation of the actuator in a second direction causes the first output link and the second output link to move linearly toward the first face and the second face, respectively.

15. The dual acting linear drive mechanism according to claim 14, the leadscrew assemblies further comprising a planet gear being connected to the drive gear;

a leadscrew nut being encased in the planet gear; and a threaded leadscrew rod being engaged in the leadscrew nut, wherein the output link prevents rotation of the threaded leadscrew rod.

16. The dual acting linear drive mechanism according to claim 15, further comprising a housing including a first face and a second face being opposite the first face, wherein the planet gears mesh with the drive gear and rotate within the housing absent revolving within the housing.

17. The dual acting linear drive mechanism according to claim 15, further comprising a housing including a first face and a second face being opposite the first face, wherein the planet gears mesh with the drive gear and rotate within the housing absent revolving within the housing, wherein the first output link is external to the housing and adjacent to the first face, and wherein the second output link is external to the housing and adjacent to the second face.

18. The dual acting linear drive mechanism according to claim 14, wherein the drive gear comprises one of a sun gear and a ring gear.

19. The dual acting linear drive mechanism according to claim 14, the actuator further comprising an input disk slidably engaged with the output link and which rotates within the output link or an input ring slidably engaged with the output link and which rotates around the output link; and a plurality of sliding rods, wherein the sliding rods are rigidly attached to one of the input disk and the input ring, wherein the sliding rods are slidingly engaged with the drive gear, and wherein the output links expand and contract in the opposite direction of each other by operation of the actuator.

\* \* \* \* \*